Patented Nov. 8, 1932

1,886,485

UNITED STATES PATENT OFFICE

RICHARD KUHN, OF ZURICH, AND WALTER KERN, OF SISSACH, SWITZERLAND, ASSIGNORS TO THE FIRM: SOCIETY OF CHEMICAL INDUSTRY IN BASLE, OF BASEL, SWITZERLAND

PROCESS OF MAKING DYESTUFFS OF THE POLYMETHINE SERIES AND NEW INTERMEDIATE PRODUCTS THEREFOR

No Drawing. Application filed July 20, 1929, Serial No. 379,880, and in Switzerland July 28, 1928.

The present invention relates to a new process for the manufacture of dyestuffs of the polymethine series and of intermediate products therefor. It comprises the new process, new products, and the material that has been dyed with same.

It is known that dyestuffs of the said series can be made by causing an ortho-formic acid ester or a salt of formic acid to act on a cyclic ammonium salt having a methyl-group in a position in which it can react, that is to say in α-position to the nitrogen. Both the reactions involved lead to polymethine dyestuffs which may be regarded as symmetrical because in them two similar heterocyclic compounds are united by a polymethine chain. Unsymmetrical polymethine dyestuffs, that is to say such as contain different heterocyclic compounds united by a polymethine chain are not obtainable according to these processes.

We have now found a process which leads to new intermediate products and also to both symmetrical dyestuffs and unsymmetrical dyestuffs of the polymethine series.

The new intermediate products and the dyestuffs are obtained from cyclic ammonium salts having a methyl-group capable of reaction, that is to say in α-position to the nitrogen, or from the methylene bases thereof of the general formula

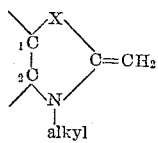

wherein the pair of carbon atoms $C_1$ $C_2$ belongs to an aromatic nucleus, such as an unsubstituted or substituted benzene or naphthalene residue and $x$ stands for a bivalent organic residue, such as

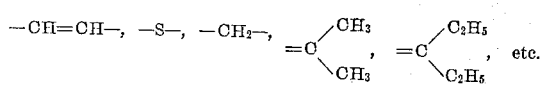

Such products are, among others, N-ethyl-2-methylenedihydroquinoline of the formula

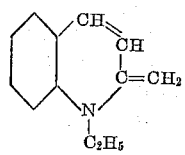

and the derivatives thereof substituted in the benzene nucleus; N-methyl-2-methylenebenzthiazoline of the formula

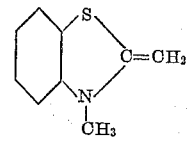

and the derivatives thereof substituted in the benzene nucleus;

1:3:3-trimethyl-2-methyleneindoline of the formula

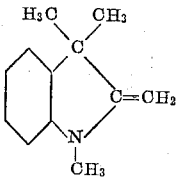

and the derivatives thereof substituted in the benzene nucleus.

Particularly suitable for the production of the new intermediate products are the derivatives of indoline and naphthindoline.

If one molecular proportion of a mineral acid salt of a derivative of formic acid of the general formula

wherein $w$ represents a substituent capable of being exchanged, such as halogen, $NH_2$, $O.C_2H_5$, $O.CO.CH_3$, which is characteristical for the imidhalides, amidines, imido ethers and imido esters, is allowed to react, in the presence of acylating agents, such as acetic anhydride, propionic acid anhydride and benzoic acid anhydride, with the above described methylene bases, advantageously at raised temperature, there are obtained the new intermediate products of the general formula

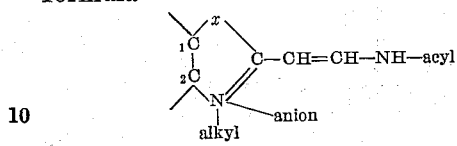

wherein the pair of carbon atoms $C_1$ $C_2$ and $x$ have the above mentioned significations, anion stands for Cl, Br, I, $SO_4H$, $ClO_4$, etc., and the acyl residue corresponds to the acylating agent used.

The intermediate products thus obtained, or the bases obtained therefrom by the action of alkalies, are then condensed in the presence of organic solvents or suspending agents, such as alcohol, acetic anhydride, pyridine, with a further molecular proportion of a cyclic ammonium salt having a methyl-group in a position in which it can react, that is to say in α-position to the nitrogen, or its methylene base of the general formula

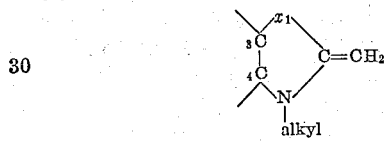

wherein the pair of carbon atoms $C_3$ $C_4$ belongs to an aromatic nucleus, such as an unsubstituted or substituted benzene or naphthalene residue, and $x_1$ stands for a bivalent organic residue, such as

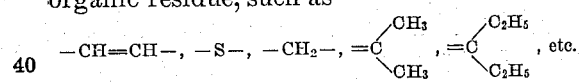

In this manner there are obtained symmetrical and unsymmetrical dyestuffs of the general formula

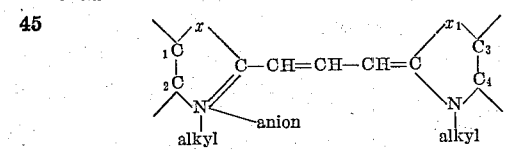

wherein each of the pairs of carbon atoms $C_1$ $C_2$ and $C_3$ $C_4$ belongs to an aromatic residue and $x$, $x_1$ and anion have the above described significations.

New unsymmetrical dyestuffs are obtained if the intermediate products of the indoline series of the general formula

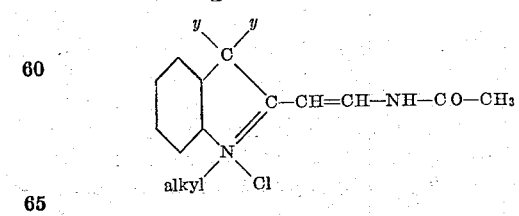

wherein the two $y$'s stand for alkyl or the trivalent nitrogen containing bases obtained therefrom by the action of alkalies, are condensed in the presence of organic solvents or suspending agents, such as acetic anhydride, alcohol or pyridine, with a further molecular proportion of a cyclic ammonium salt having a methyl-group in a position in which it can react, that is to say in α-position to the nitrogen, or its methylene base of the general formula

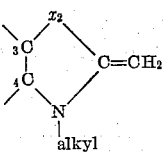

wherein the pair of carbon atoms $C_3$ $C_4$ has the above described signification, and $x_2$ stands for a bivalent organic residue containing less than 3 carbon atoms, such as $-CH_2$, $-CH=CH-$, $-S-$. The dyestuffs thus obtained form crystals of metallic lustre which dissolve in water to yellow to blue-red solutions, dyeing cotton mordanted with tannin, or silk, pink to violet-red tints.

If two molecular proportions of the above-named cyclic ammonium salts, or the methylene bases thereof, are condensed in a similar manner with one molecular proportion of the salts of imidhalides, amidines, imido ethers and imido esters, the symmetrical dyestuffs are directly obtained without the separation of an intermediate product.

The new intermediate products are also useful for pharmaceutical purposes.

The following examples illustrate the invention, the parts being by weight:—

*Example 1*

A mixture of 104 parts of 1:3:3-trimethyl-2-methylene-indoline, 80 parts of formiminoethylether-hydrochloride, 500 parts of acetic anhydride and 36 parts of glacial acetic acid is heated, while stirring, for 20 minutes at 120°–130° C. The mixture is then mixed with water for decomposing the acetic anhydride and the solution is salted out by means of potassium iodide. On cooling, the iodide of the intermediate product separates in very good yield. It is filtered and crystallized from alcohol, from which it separates in yellowish needles which decompose at 240–247° C. They dissolve somewhat freely in water and are very sparingly soluble in benzene and ether. The new product can also be separated in the form of a perchlorate compound by means of potassium perchlorate. This compound crystallizes from alcohol in yellow prisms which decompose at 228–229° C. The free base can be isolated, for instance by cooling the mixture and making it alkaline with dilute caustic soda solution which precipitates a reddish brown substance that soon resinifies. However, if the alkaline mixture is extracted with ether and after separation and filtration the ether is evaporated, the base is obtained in the form of orange-yellow laminæ, which, however, are not very stable.

The probable explanation of the transformations concerned may be represented by the following scheme:

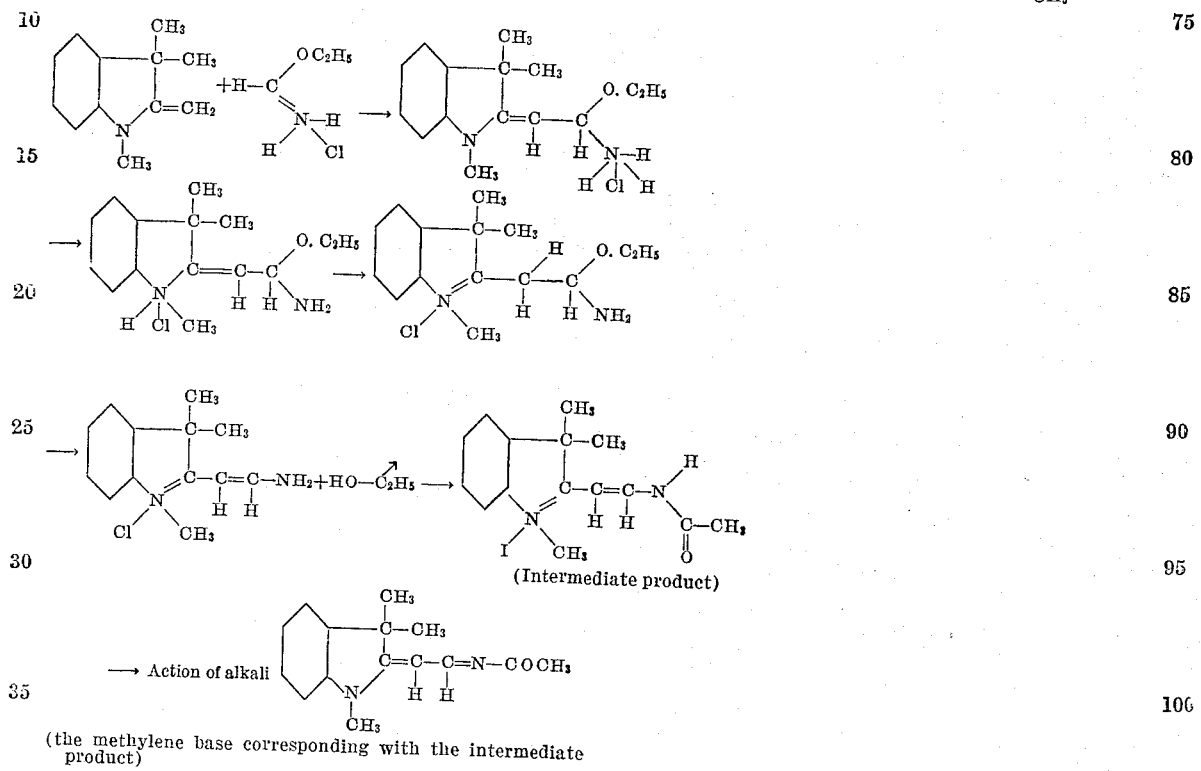

(the methylene base corresponding with the intermediate product)

If, for the formiminoether-hydrochloride, there is substituted the corresponding quantity of formiminochloride, formamidinehydrochloride or formimino-acetic acid ester, the same final product is obtained. Analogous products are obtained on the other hand when for the 1:3:3-trimethyl-2-methyleneindoline, a substitution product thereof is substituted.

*Example 2*

242 parts of the intermediate product obtainable as described in Example 1 in the form of the free base and 173 parts of 1:3:3-trimethyl-2-methyleneindoline are heated with 1200 parts of acetic anhydride at 40° C., while stirring, and are maintained at a temperature of 40–45° C. for 7 hours. Hereupon the greater part of the acetic anhydride is distilled under a slight vacuum, the residue is mixed with water and the dyestuff salt is precipitated after filtration by means of hydrochloric acid. After filtration, washing with dilute hydrochloric acid and drying, there is obtained the 1:3:3:1′:3′:3′-hexamethyl- in the form of beautiful crystals and in good yield.

strepto-mono-vinylene-2:2′-indocyanine-chloride of the formula

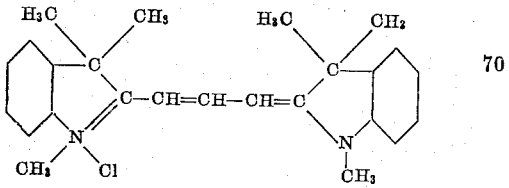

The dyestuff formation may occur in other media, for example in alcohol.

*Example 3*

To a solution of 346 parts of 1:3:3-trimethyl-2-methyleneindoline in 1000 parts of acetic anhydride are added gradually at 60° C., while stirring, 110 parts of formiminoethyl-ether-hydrochloride; the dyestuff formation is immediately to be observed. The temperature is raised gradually to 95° C. and the reaction is allowed to continue for ½ hour. After cooling, the whole is mixed with water and the 1:3:3:1′:3′:3′-hexamethyl-strepto-monovinylene-2:2′-indocyanine-chloride of the formula

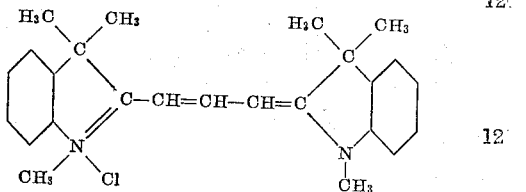

is isolated as described in Example 2.

The same dyestuff is obtained if formiminochloride, formamidine hydrochloride, formimino-acetic acid-ester or the like, is substituted for the formimino-ethylether-hydrochloride.

*Example 4*

To a solution of 173 parts of 1:3:3-trimethyl-2-methylene-indoline in 1000 parts of pyridine are added, while stirring, 200 parts of formimino-ethylether-hydrochloride and the mixture is heated for 15–20 hours at 40–50° C. The deep red solution is diluted with water and the 1:3:3:1′:3′:3′-hexamethyl-strepto-monovinylene-2:2′-indocyanine chloride of the formula

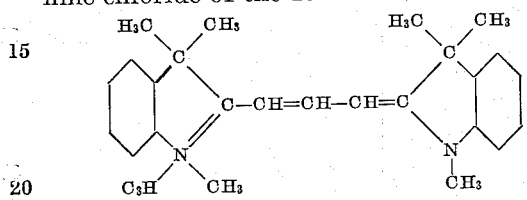

is precipitated by addition of hydrochloric acid.

*Example 5*

191.5 parts of N-methyl-6-chloro-α-methylene-dihydro-quinoline and 225 parts of formimino-ethyletherhydrochloride are dissolved together in 1400 parts of pyridine while stirring and the solution is maintained for 15–20 hours at 40–45° C. The dyestuff formed is insoluble in pyridine and therefore separates, mixed with ammonium chloride. By filtering and washing the solid matter with water to separate the ammonium chloride, the 1:1′-dimethyl-6:6′-dichloro-strepto-monovinylene-2:2′-quinocyanine-chloride of the formula

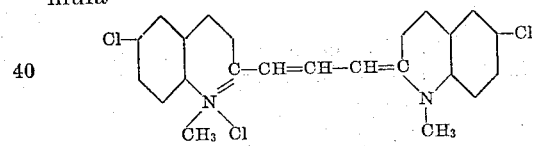

is isolated.

*Example 6*

242 parts of the base obtainable as described in Example 1 and 157 parts of N-methyl-α-methylene-dihydroquinoline in 1800 parts of acetic anhydride, are stirred together and heated for some hours at 40–45° C. After the larger part of the acetic anhydride has been distilled in a vacuum, water is added and the unsymmetrical dyestuff is salted out by means of potassium chloride.

By recrystallization from alcohol, the 1:1′:3:3-tetramethyl-strepto-monovinylene-2:2′-indoquinocyanine-chloride of the formula

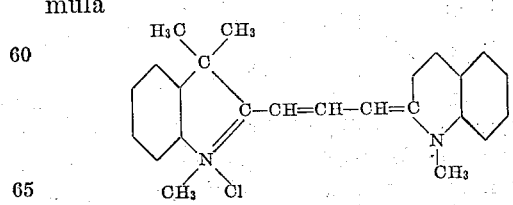

is obtained in shot-green needles of metallic lustre. The dyestuff dyes cotton mordanted with tannin, or silk, bluish red tints of good fastness. In analogous manner the base obtained as described in Example 1 may be condensed with the methylene bases of substituted quinaldines, for example the 6-methyl-, 6-chloro-, 6-ethoxy-, 8-methyl and β-naphthoquinaldine to similar unsymmetrical dyestuffs.

*Example 7*

The dystuff obtained as described in Example 4 is dissolved in distilled water and 1 per cent. of acetic acid is added. Cotton mordanted with tannin is entered cold and handled in the bath until the dyestuff is nearly exhausted. The bath is then gradually heated to 80° C. After cooling, without rinsing, the goods are dried.

What we claim is:—

1. In the manufacture of dyestuffs of the polymethine series, the step which comprises condensing one molecular proportion of a methylene base of the general formula

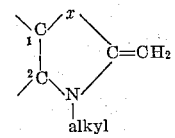

wherein the pair of carbon atoms $C_1$ $C_2$ belongs to a benzene or a naphthalene nucleus, and $x$ stands for

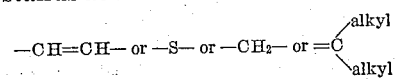

in the presence of an acylating agent with one molecular proportion of a mineral acid salt of a derivative of formic acid of the general formula

wherein $w$ stands for halogen or $NH_2$ or $O-C_2H_5$ or $O-CO-CH_3$.

2. In the manufacture of dyestuffs of the polymethine series, the step which comprises condensing one molecular proportion of a methylene base of the indolenine series of the general formula

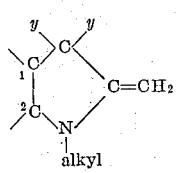

wherein the pair of carbon atoms $C_1$ $C_2$ belongs to a benzene or a naphthalene nucleus, and the two $y$'s stand for hydrogen atoms or alkyl residues, in the presence of an acylating agent with one molecular proportion of a mineral acid salt of a derivative of formic acid of the general formula

wherein $w$ stands for halogen or $NH_2$ or $O-C_2H_5$ or $O-CO-CH_3$.

3. In the manufacture of dyestuffs of the polymethine series, the step which comprises condensing one molecular proportion of trimethylindoline of the formula

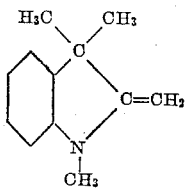

in the presence of an acylating agent with one molecular proportion of a mineral acid salt of a derivative of formic acid of the general formula

wherein $w$ stands for halogen or $NH_2$ or $O-C_2H_5$ or $O-CO-CH_3$.

4. In the manufacture of dyestuffs of the polymethine series, the step which comprises condensing one molecular proportion of trimethylindoline of the formula

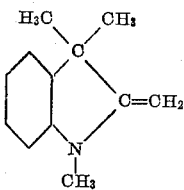

in the presence of an acylating agent with one molecular proportion of the hydrochloride of formiminochloride of the formula

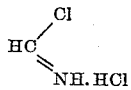

5. In the manufacture of dyestuffs of the polymethine series, the step which comprises condensing one molecular proportion of trimethylindoline of the formula

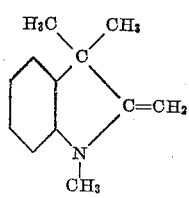

in the presence of acetic anhydride with one molecular proportion of the hydrochloride of formiminochloride of the formula

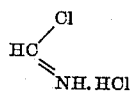

6. Process for the manufacture of dyestuffs of the polymethine series of the general formula

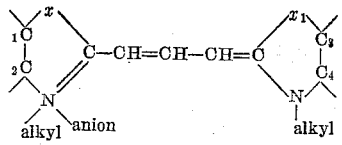

wherein each of the pairs of carbon atoms $C_1 C_2$ and $C_3 C_4$ belongs to a benzene or a naphthalene nucleus, and $x$ and $x_1$ stand for

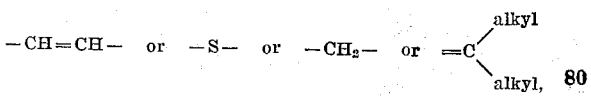

which consists in treating one molecular proportion of a methylene base of the general formula

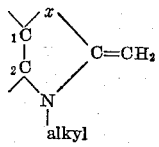

wherein the pair of carbon atoms $C_1 C_2$ belongs to a benzene or a naphthalene nucleus, and $x$ stands for

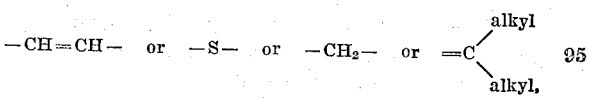

in the presence of an acylating agent, with one molecular proportion of a mineral acid salt of a derivative of formic acid of the general formula

wherein $w$ stands for halogen or $NH_2$ or $O-C_2H_5$ or $O-CO-CH_3$, to produce a salt of the general formula

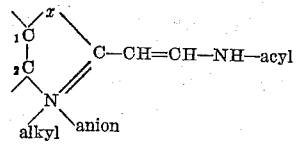

wherein the pair of carbon atoms $C_1 C_2$ belongs to a benzene or a naphthalene nucleus, and $x$ stands for

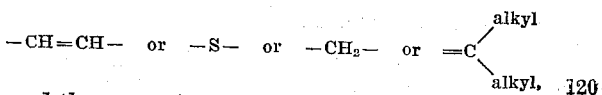

and then treating the base obtained from this salt by treatment with alkalies with one molecular proportion of a methylene base of the general formula

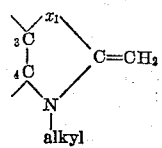

wherein the pair of carbon atoms $C_3$ $C_4$ belongs to a benzene or a naphthalene nucleus, and $x_1$ stands for

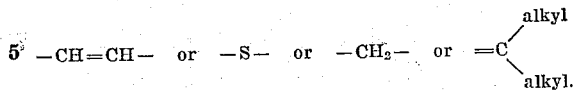

7. Process for the manufacture of dyestuffs of the polymethine series of the general formula

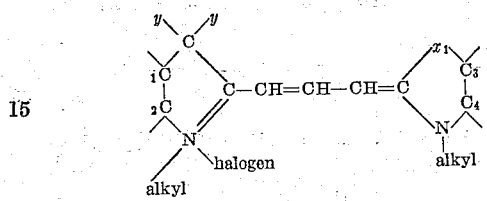

wherein each of the pairs of carbon atoms $C_1$ $C_2$ and $C_3$ $C_4$ belongs to a benzene or a naphthalene nucleus, and the two $y$'s stand for hydrogen or alkyl residues, and $x_1$ stands for

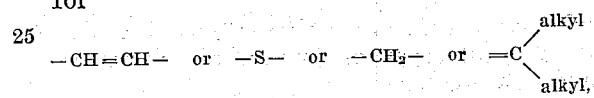

which consists in treating one molecular proportion of a methylene base of the indolenine series of the general formula

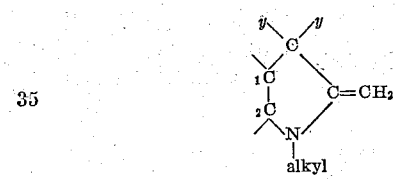

wherein the pair of carbon atoms $C_1$ $C_2$ belongs to a benzene or a naphthalene nucleus and the two $y$'s stand for hydrogen or alkyl residues, in the presence of an acylating agent with one molecular proportion of a mineral acid salt of a derivative of formic acid of the general formula

wherein $w$ stands for halogen or $NH_2$ or $O—C_2H_5$ or $O—CO—CH_3$, to produce a salt of the general formula

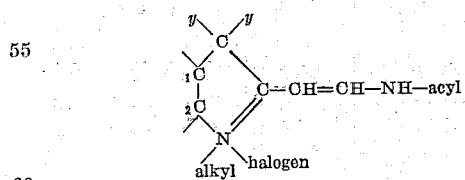

wherein the pair of carbon atoms $C_1$ $C_2$ belongs to a benzene or a naphthalene nucleus, and the two $y$'s stand for hydrogen or alkyl residues, and then treating the base obtained form this salt by treatment with alkalies with one molecular proportion of a methylene base of the general formula

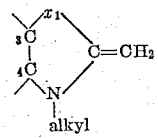

wherein the pair of carbon atoms $C_3$ $C_4$ belongs to a benzene or a naphthalene nucleus, and $x_1$ stands for

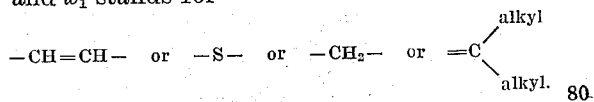

8. Process for the manufacture or dyestuffs of the polymethine series of the general formula

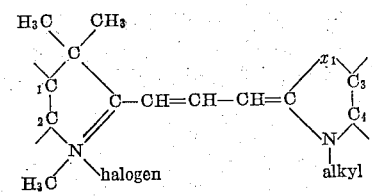

wherein each of the pairs of carbon atoms $C_1$ $C_2$ and $C_3$ $C_4$ belongs to a benzene or a naphthalene nucleus, and $x_1$ stands for

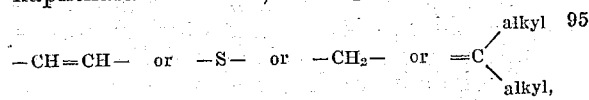

which consists in treating one molecular proportion of a residue of a trimethylindoline of the general formula

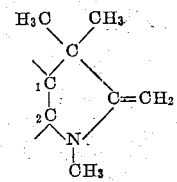

wherein the pair of carbon atoms $C_1$ $C_2$ belongs to a benzene or a naphthalene nucleus, in the presence of an acylating agent with one molecular proportion of the hydrochloride of formiminochloride of the formula

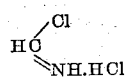

to produce a salt of the general formula

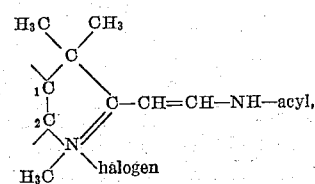

wherein the pair of carbon atoms $C_1$ $C_2$ belongs to a benzene or a naphthalene nucleus, and then treating the base obtained from this salt by treatment with alkalies with one molecular proportion of a methylene base of the general formula

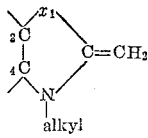

wherein the pair of carbon atoms $C_3$ $C_4$ belongs to a benzene or a naphthalene nucleus, and $x_1$ stands for $$-CH=CH-\quad \text{or}\quad -S-\quad \text{or}\quad -CH_2-\quad \text{or}\quad =C\!\!<^{alkyl}_{alkyl}.$$

9. Process for the manufacture of dyestuffs of the polymethine series of the general formula

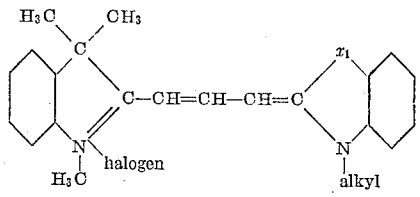

wherein $x_1$ stands for $$-CH=CH-\quad \text{or}\quad -S-\quad \text{or}\quad -CH_2-\quad \text{or}\quad =C\!\!<^{alkyl}_{alkyl},$$

which consists in treating one molecular proportion of trimethylindoline of the formula

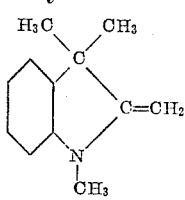

in the presence of acetic anhydride with one molecular proportion of the hydrochloride of formiminochloride of the formula

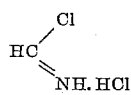

to produce a salt of the formula

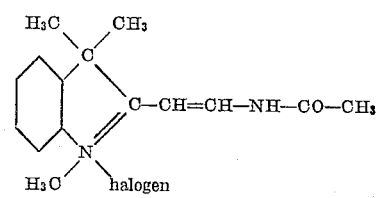

and then treating the base obtained from this salt by treatment with alkalies with one molecular proportion of a methylene base of the general formula

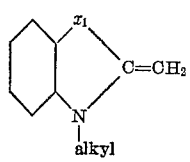

wherein $x_1$ stands for $$-CH=CH-\quad \text{or}\quad -S-\quad \text{or}\quad -CH_2-\quad \text{or}\quad =C\!\!<^{alkyl}_{alkyl},$$

10. As new products, the unsymmetrical dyestuffs of the polymethine series of the general formula

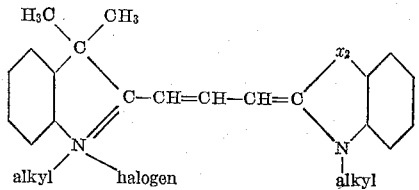

wherein $x_2$ stands for $$-CH_2-\quad \text{or}\quad -CH=CH-\quad \text{or}\quad -S-$$

which products form crystals of metallic lustre which dissolve in water to yellow to blue-red solutions, dyeing cotton mordanted with tannin, or silk, pink to violet-red tints.

11. As a new product the unsymmetrical dyestuff of the polymethine series of the formula

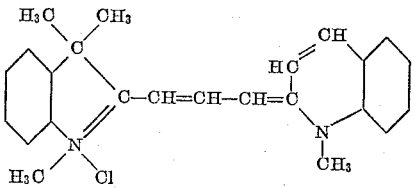

which product forms crystals of metallic lustre which dissolve in water to blue-red solutions, dyeing cotton mordanted with tannin, or silk, violet-red tints.

In witness whereof we have hereunto signed our names this 9th day of July, 1929.

RICHARD KUHN.
WALTER KERN.